United States Patent
Zindel (10) Patent No.: US 11,618,078 B2
(45) Date of Patent: Apr. 4, 2023

(54) USE OF ADDITIVE MANUFACTURING PROCESSES TO CONSOLIDATE POWDER METALLURGY ALLOYS FOR ELEVATED TEMPERATURE APPLICATIONS

(71) Applicant: Ford Global Technologies, LLC, Dearborn, MI (US)

(72) Inventor: Jacob Wesley Zindel, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 350 days.

(21) Appl. No.: 16/716,695

(22) Filed: Dec. 17, 2019

(65) Prior Publication Data
US 2021/0178474 A1    Jun. 17, 2021

(51) Int. Cl.
*B22F 10/25*    (2021.01)
*B22F 10/28*    (2021.01)
(Continued)

(52) U.S. Cl.
CPC .............. *B22F 10/00* (2021.01); *B22F 10/20* (2021.01); *B22F 10/25* (2021.01); *B22F 10/28* (2021.01); *B22F 2301/052* (2013.01); *B22F 2301/35* (2013.01); *B33Y 10/00* (2014.12); *B33Y 40/20* (2020.01); *B33Y 80/00* (2014.12); *G01N 2203/0298* (2013.01)

(58) Field of Classification Search
CPC ................................ B22F 10/28; B22F 10/20
See application file for complete search history.

(56) References Cited

U.S. PATENT DOCUMENTS

2016/0138400 A1 *  5/2016  Karabin ................. B33Y 10/00
                                                                    420/537
2018/0010216 A1    1/2018  Vo et al.

FOREIGN PATENT DOCUMENTS

WO    2018119283    6/2018
WO    2019109135    6/2019

OTHER PUBLICATIONS

Zhang, et al., A review of selective laser melting of aluminum alloys: Processing microstructure, property and developing trends, Journal of Materials Science & Technology, vol. 35, pp. 270-284, Elsevier Publishing, 2019.

* cited by examiner

*Primary Examiner* — Jophy S. Koshy
*Assistant Examiner* — Joshua S Carpenter
(74) *Attorney, Agent, or Firm* — Burris Law, PLLC (57) ABSTRACT

A method of manufacturing a part includes melting, rapidly solidifying and consolidating pre-alloyed powders using an additive manufacturing process. The method provides a finished part with a microstructure with at least one non-equilibrium phase. The pre-alloyed powders can be powders of aluminum alloyed with iron and molybdenum, and the additive manufacturing process forms a near-net shaped part that can be finished with techniques such as machining, polishing and drilling, among others. The additive manufacturing process can be a laser melting technique such as selective laser melting or laser metal deposition and an average dendrite arm spacing of the rapidly solidified and consolidate pre-alloyed powders is less than 1.0 μm. Finished parts formed from the aluminum alloy powders alloyed with iron and molybdenum exhibit enhanced strength at elevated temperatures such as an ultimate tensile strength greater than 400 MPa at 300° C. and greater than 350 MPa at 350° C.

13 Claims, 4 Drawing Sheets

(51) Int. Cl.
*B22F 10/20* (2021.01)
*B33Y 80/00* (2015.01)
*B33Y 40/20* (2020.01)
*B33Y 10/00* (2015.01)
*B22F 10/00* (2021.01)

USE OF ADDITIVE MANUFACTURING PROCESSES TO CONSOLIDATE POWDER METALLURGY ALLOYS FOR ELEVATED TEMPERATURE APPLICATIONS

FIELD

The present disclosure relates to additive manufacturing of metal parts.

BACKGROUND

The statements in this section merely provide background information related to the present disclosure and may not constitute prior art.

Additive manufacturing (AM) processes such as selective laser melting (SLM) and direct metal laser sintering (DMLS) are used to make parts from metal powders, i.e., metal parts. Both SLM and DMLS processes use a laser to melt successive layers of metal powder that solidify into solid metal layers that are bonded to each other and form the metal part one layer at a time.

After the metal part is formed, post processing techniques are used to improve the density of the metal part. However, post processing techniques require additional time and expense, and can reduce the mechanical properties of the metal part.

These issues, among other issues related to AM of metal parts are addressed in the present disclosure.

SUMMARY

In one form of the present disclosure a method of manufacturing a part includes melting, rapidly solidifying and consolidating pre-alloyed powders via an additive manufacturing process such that a finished part with a microstructure comprising at least one non-equilibrium phase is formed. In at least one variation of the present disclosure the additive manufacturing process forms a near-net shaped part and the microstructure with the non-equilibrium phase is retained after finishing the near-shaped metal part. In some variations the additive manufacturing is a laser melting technique selected from the group consisting of selective laser melting and laser metal deposition. In such variations a finished part has a microstructure with an average dendrite arm spacing or cell size (simply referred to herein as "dendrite arm spacing") of less than 1.0 μm. For example, in at least one variation the average dendrite arm spacing is less than 0.5 μm. In some variations the microstructure with the at least one non-equilibrium phase is devoid of any equilibrium intermetallic phases.

In some variations of the present disclosure the pre-alloyed powders are pre-alloyed Al—Fe—Mo powders. In such variations the pre-alloyed Al—Fe—Mo powders comprise Al, between about 4.0 wt. % to about 20 wt. % Fe, and between about 1.0 wt. % to about 10.0 wt. % Mo. In one variation the pre-alloyed Al—Fe—Mo powders comprise Al, about 8.0 wt. % Fe and about 2.0 wt. % Mo. A finished part made from the pre-alloyed Al—Fe—Mo powders has a microstructure with a matrix comprising a non-equilibrium phase and an average dendrite arm spacing of less than 1.0 μm. In some variations the average dendrite arm spacing of the finished part is less than 0.5 μm and in at least one variation the average dendrite arm spacing of the finished part is less than 0.25 μm. Also, the finished part has at least one of an ultimate tensile strength greater than 300 MPa at 300° C. and an ultimate tensile strength greater than 250 MPa at 350° C. In some variations the finished part has at least one of an ultimate tensile strength greater than 350 MPa at 300° C. and an ultimate tensile strength greater than 300 MPa at 350° C., for example at least one of an ultimate tensile strength greater than 400 MPa at 300° C. and an ultimate tensile strength greater than 350 MPa at 350° C.

In another form of the present disclosure a metal part is provided. The metal part is formed by selective laser melting pre-alloyed powders and forming a near-net shaped metal part with a microstructure comprising at least one non-equilibrium phase. Also, the non-equilibrium phase in the microstructure is retained after finishing of the near-net shaped metal part. In at least one variation a matrix of the microstructure is a non-equilibrium phase. In some variations the metal part is finished using at least one of machining, polishing and drilling the metal part. In at least one variation the pre-alloyed powders are pre-alloyed Al—Fe—Mo powders. In such variations the metal part is an Al—Fe—Mo alloy part with an ultimate tensile strength greater than 350 MPa at 300° C. and an ultimate tensile strength greater than 300 MPa at 350° C. In at least one variation the metal part is an Al—Fe—Mo alloy part with an ultimate tensile strength greater than 400 MPa at 300° C. and an ultimate tensile strength greater than 350 MPa at 350° C.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
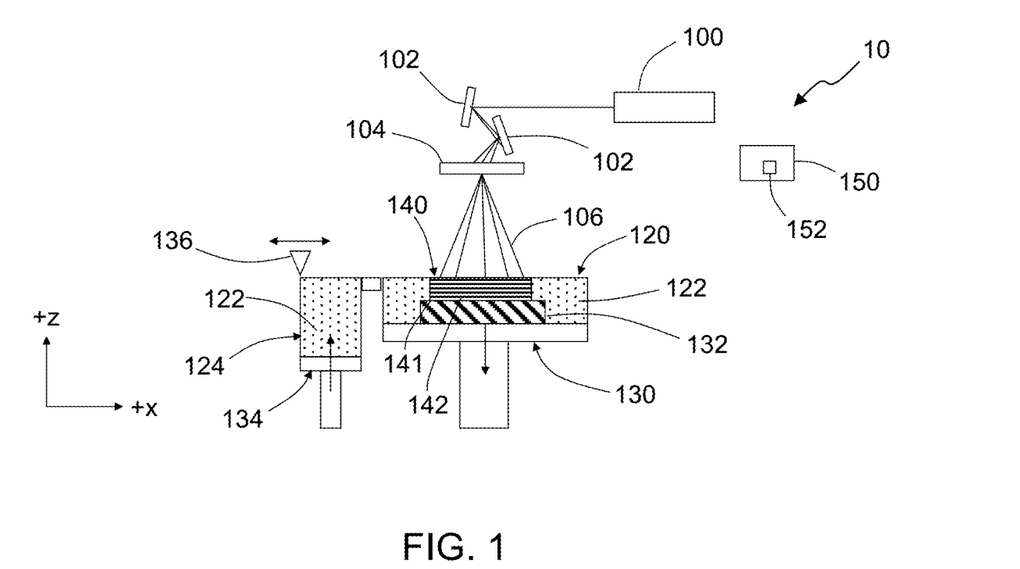
FIG. 1 is a side cross-section view of a part being made by selective laser melting according to the teachings of the present disclosure.

Referring to FIG. 1, a selective laser melting (SLM) machine 10 making a part 140 is shown. The SLM machine 10 includes a laser source 100 that produces or provides a laser beam 106, and one or more reflecting mirrors 102 and a focusing lens 104 that reflect and focus the laser beam 106 along a desired path and/or pattern. The SLM machine 10 includes a powder bed 120 and a powder reservoir 124, both of which have or contain metal powder 122. As used herein, the term "metal" refers to pure metals and alloys unless stated otherwise. In some variations of the present disclosure, the metal powder 122 is pre-alloyed powder. At least a portion of the metal powder 122 in the powder bed 120 is positioned on and supported by a platform 130, as is a base plate 132, and the metal powder 122 in the powder reservoir 124 is positioned on and supported by a reservoir plate 134. The platform 130 and the reservoir plate 134 are operable to move in an up and down direction (+/−z direction). Also, a wiper or spreader 136 is included and operable to move and spread metal powder 122 from the powder reservoir 124 across the powder bed 120 as described below. The SLM machine 10 also includes a processor or computer 150 in communication with and operable to provided executable instructions the laser source 100, reflecting mirrors 102, focusing lens 104, platform 130, reservoir plate 134, and spreader 136.

Still referring to FIG. 1, in some variations of the present disclosure, a model 152 of the part 140, e.g., a computer aided design (CAD) model 152 of the part 140, is stored in the processor 150 and includes a plurality of slices or layers that make up the metal part 140. That is, the CAD model 152 of the part 140 is divided into a plurality of slices or layers and each slice is used to provided executable instructions to the SLM machine 10 such that each layer of the part 140 is formed. For example, a first slice or layer of the part 140 is formed by spreading a first thin layer of metal powder 122 across the base plate 132, and then reflecting and focusing the laser beam 106 onto the first thin layer of metal powder 122 along a pattern or area as provided by a first slice of the CAD model 152. As the laser beam 106 focuses on particles in the first thin layer of metal powder 122, the particles melt and rapidly solidify such that a first solid layer 141 of metal is formed.

Figure 2:
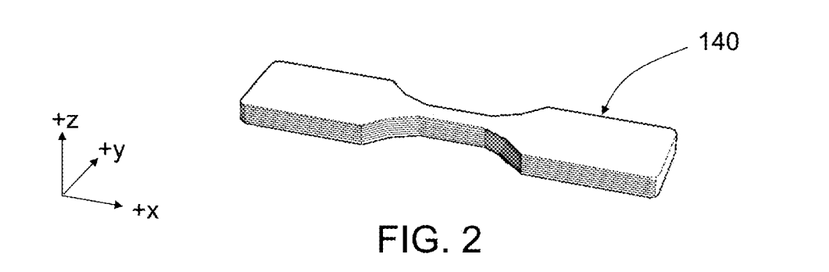
FIG. 2 shows a part made from pre-alloyed powder according to the teachings of the present disclosure.

After the first solid layer 141 is formed, the platform 130 moves in a downward direction (−z direction) by a predetermined amount (distance) and a second thin layer of metal powder 122 is spread across the first solid layer 141 of metal. It should be understood that the predetermined distance the platform 130 moves in the downward direction is generally equal to a thickness of the second thin layer of metal powder 122. Also, the metal powder 122 used to form the second thin layer is provided from the powder reservoir 124 and the spreader 136. That is, the reservoir plate 134 moves in an upward direction (+z direction) a predetermined amount such that sufficient metal powder 122 is provided for the spreader 136 to sweep the second thin layer of metal powder 122 across the first solid layer 141. After the second thin layer of metal powder 122 is spread across the first solid layer 141, the laser beam 106 is reflected and focused across the second thin layer of metal powder 122 along a path and/or pattern in accordance with a second slice of the CAD model 152 such that the metal powder 122 in the layer melts and rapidly solidifies to form a second solid layer 142 of metal that is joined (welded or solidified) onto the first solid layer 141. This cycle continues until all of the layers that make up the part 140 are formed. One example of a metal part 140 formed in this manner and having the shape a tensile test sample is shown in FIG. 2. In some variations of the present disclosure the metal part 140 formed by the SLM machine 10 is a near-net shaped metal part 140 that is finished (to from a finished part) using techniques or processes such as machining, polishing and drilling, among others. In other variations the metal part 140 formed by the SLM machine 10 is a finished metal part 140. As used herein, the phrase "finished part" or "finished metal part" refers to a part that is placed or is ready to be placed into its intended use. Also, it should be understood that a microstructure of the near-net shaped metal part 140 and a microstructure of the finished metal part comprises a non-equilibrium phase as discussed in greater detail below.

Non-limiting examples of the thickness (z direction) of the thin layers of metal powder 122 spread across previously formed solid layers include thicknesses between 10 micrometers (μm) and 40 μm, between 40 μm and 80 μm, between 80 μm and 120 μm, and between 120 μm and 200 μm, among others. Non-limiting examples of the thickness (z direction) of the thin solid layers of metal include thicknesses between 5 μm and 20 μm, between 20 μm and 60 μm, between 60 μm and 100 μm, and between 100 μm and 200 μm, among others.

It should be understood that melting and solidifying the metal powder 122 with the laser beam 106 results in rapid solidification of the metal powder 122. For example, cooling rates for the solidification of the metal powder 122 having been melted by the laser beam range from $10^4$ degrees centigrade per second (° C./s) to $10^{7\circ}$ C./s. It should also be understood that solidification of pre-alloyed powders at such solidification rates does not provide sufficient time for phase equilibrium to be established within the solid layers. That is, rapid solidification of the pre-alloyed powder does not allow sufficient diffusion to occur within the solidified material such that phase equilibrium is established. Accordingly, the solid layers are "frozen" in a non-equilibrium state. In some variations of the present disclosure the rapidly solidified pre-alloyed powder forms a solid thin layer with a microstructure comprising a matrix that is a non-equilibrium phase, i.e., a non-equilibrium matrix. For example, in at least one variation the matrix is a non-equilibrium body centered cubic (BCC) alpha prime ($\alpha'$) phase or a non-equilibrium face centered cubic (FCC) gamma prime ($\gamma'$) phase supersaturated with one or more alloying elements. And the matrix would transform into an equilibrium BCC alpha ($\alpha$) phase or an equilibrium FCC gamma ($\gamma$) phase with at least one second equilibrium phase if sufficient diffusion were allowed to occur during solidification or heat treatment.

Figure 3:
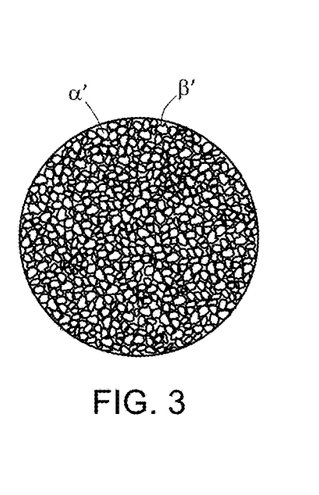
FIG. 3 is a representative microstructure of the part in FIG. 2 made according to the teachings of the present disclosure.
Figure 4:
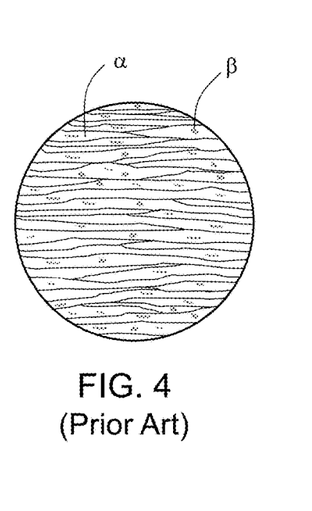
FIG. 4 is a representative microstructure of the part in FIG. 2 made from conventional wrought material.
Figure 5:
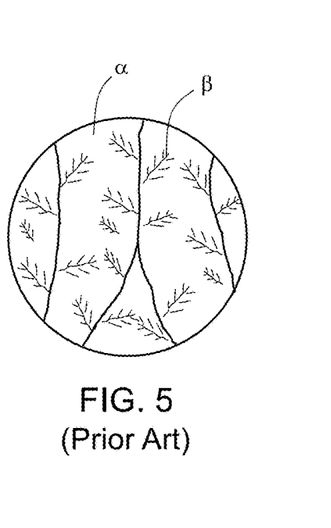
FIG. 5 is a representative microstructure of a part in FIG. 2 made from conventional cast material.

Referring to FIGS. 3-5, a representative microstructure of the part 140 formed from a given alloy composition (referred to herein as "composition X") according to the teachings of the present disclosure is shown in FIG. 3, and representative microstructures of the part 140 formed from composition X using conventional manufacturing methods are shown in FIGS. 4 and 5. Particularly, FIG. 3 shows a microstructure for the part 140 formed by SLM of pre-alloyed powders as described above, FIG. 4 shows a microstructure for the part 140 formed from a wrought form of an alloy (e.g., formed via extrusion) with composition X, and FIG. 5 shows a representative microstructure for the part 140 formed by casting of an alloy with composition X. As used herein, the phrase "wrought", "wrought form" or "wrought alloy" refers to a metal or metal part subjected to thermo-mechanical processing (e.g., heating plus rolling, forging, and extrusion, among others) such that the microstructure of the metal undergoes recrystallization or transformation of the non-equilibrium phase(s) to coarse, more thermodynamically stable phases. The term "casting" or "cast" refers to a part formed from a metal that has been melted, poured into a near-net shape of the final form, and allowed to solidify such that final form is provided without thermomechanical processing and recrystallization of the microstructure.

Referring particularly to FIG. 3, the microstructure of the part 140 formed using SLM has very fine (small) dendrites compared to the dendrites of the wrought alloy (FIG. 4) and cast alloy (FIG. 5). Also, the microstructure of the part 140 formed using SLM (FIG. 3) has at least one non-equilibrium phase β' (the black material in the figure) and in some variations the matrix of the microstructure is also a non-equilibrium phase α' (the white material in the figure). That is, melting and rapid solidifying the pre-alloyed powder (FIG. 3) does not allow sufficient time for diffusion to occur such that equilibrium phases can form. In some variations, the alloying elements in the melted pre-alloyed powder particles (i.e., in the liquid phase) are trapped into solid solution in the resulting solid phase. It should be understood that such a microstructure results in a crystalline lattice misfit or lattice strain that can provide enhanced properties (e.g., increase in strength) for the material. It should also be understood that the part 140 formed by SLM can be a near-net shaped part that is not subjected to thermomechanical processing and recrystallization. Accordingly, in some variations of the present disclosure the microstructure shown in FIG. 3 is representative of the final microstructure of the part 140.

In contrast, the microstructure shown in FIG. 4 includes a decomposed multiphase structure with a matrix of a first phase 'α' and a second phase 'β' (and possible other phases) within the α matrix. In some variations of the present disclosure the α and/or β phases are equilibrium phases, i.e., the chemical potentials of the α and β phases remain steady (constant) with time and are phases predicted from an equilibrium phase diagram of the alloy. It should be understood that quasi-equilibrium phases (also known as metastable phases) such as $Fe_3C$ in iron have a chemical potential that is constant for time periods greater than 1 year and thereby are considered equilibrium phases in the present disclosure. Similar to FIG. 4, FIG. 5 includes a two-phase α plus β microstructure. However, the β phase is in the form of dendrites as is known for cast alloys.

Figure 6:
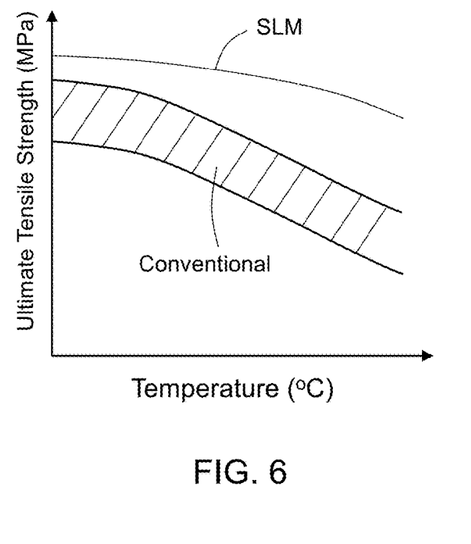
FIG. 6 is a representative plot of ultimate tensile strength versus temperature for a part manufactured using conventional methods and a part manufactured according to the teachings of the present disclosure.
Figure 7:
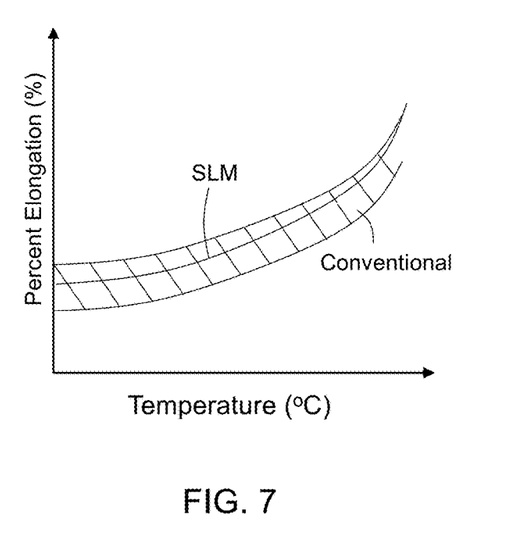
FIG. 7 is a representative plot of percent elongation (ductility) versus temperature for parts manufactured using conventional methods and a part manufactured according to the teachings of the present disclosure.

Referring now to FIGS. 6 and 7, representative plots of ultimate tensile strength (UTS) (FIG. 6) and percent elongation (ductility) (FIG. 7) as a function of temperature for conventionally manufactured parts and for parts manufactured according to the teachings of the present disclosure are shown. As shown in FIG. 6, the UTS for parts manufactured according to the teachings of the present disclosure is greater than the UTS for conventionally manufactured parts, particularly at higher temperatures. It should be understood that the lattice strain of the alloy or part manufactured according to the teachings of the present disclosure results in at least a part of the enhanced strength of the alloy. In some variations, the parts manufactured according to the teachings of the present disclosure also have the same or nearly the same ductility as conventionally produced parts as shown in FIG. 7.

Figure 8:
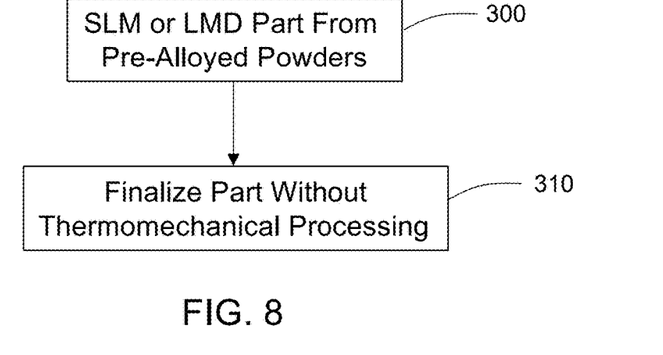
FIG. 8 is a flow chart for a method of forming a part according to the teachings of the present disclosure.

Referring to FIG. 8, a flow chart for a method 30 of making a part according to the teachings of the present disclosure is shown. The method 30 includes manufacturing a near-net shaped part from pre-alloyed powders using SLM at 300. In some variations of the present disclosure the neat-net shaped part formed at 300 is a finished part. In other variations, the near-net shaped part formed at 300 is finalized without thermomechanical processing at 310. Non-limiting examples of finalizing techniques include grinding, drilling, milling, and machining, among others. Accordingly, it should be understood that the microstructure of the part formed with method 30 is not recrystallized, has a fine (small) dendrite arm spacing compared to a part formed from conventional manufacturing processes, and has at least one non-equilibrium phase. For example, in some variations of the present disclosure a part formed using the method 30 has a microstructure with a single non-equilibrium phase (excluding grain boundaries), i.e., the matrix is a non-equilibrium phase. In other variations of the present disclosure a part formed using the method 30 has a microstructure with at least two non-equilibrium phases, e.g., a dendrite non-equilibrium phase and a matrix non-equilibrium phase.

In order to better illustrate the teachings of the present disclosure, but not limit its scope in any manner, a representative example of a part formed by laser melting and rapid solidification of an alloy is provided below.

Example

Figure 9:
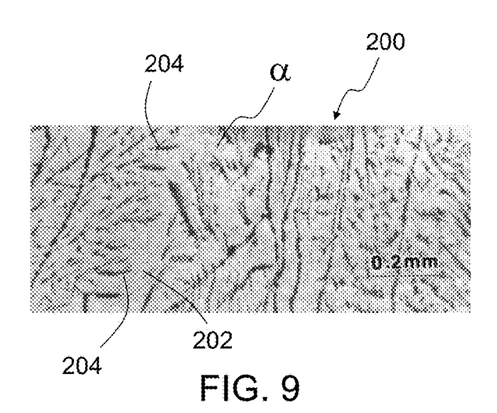
FIG. 9 is an optical micrograph of the microstructure of an Al-8Fe-2Mo alloy part formed from cast material.
Figure 10:
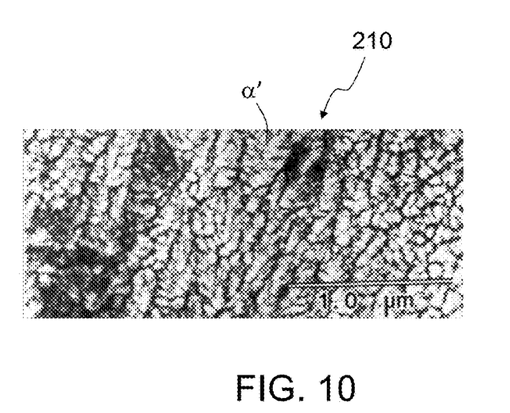
FIG. 10 is a transmission electron microscopy image of the microstructure of an Al-8Fe-2Mo alloy part formed according to the teachings of the present disclosure.

Referring to FIGS. 9 and 10, microstructures from an aluminum (Al) alloy with a nominal composition, in weight % (wt. %), of Al—8% iron—2% molybdenum (referred to herein as the "Al-8Fe-2Mo alloy") are shown. Particularly, FIG. 9 shows a microstructure 200 of a part formed by casting of the Al-8Fe-2Mo alloy and FIG. 10 shows a microstructure 210 of a part formed by laser melting and rapid solidification of the Al-8Fe-2Mo alloy. As shown in FIG. 9, the cast microstructure of the Al-8Fe-2Mo alloy includes an FCC (α) matrix 202 and dendrites 204 containing the $Al_3Fe$ intermetallic and/or the $Al_{12}Mo$ intermetallic. Also, the cast microstructure 200 of the Al alloy shown in FIG. 9 has dendrites with an average dendrite arm spacing between about 0.2 to about 1.0 millimeters (mm) (about 200 μm to about 1,000 μm). In contrast, the laser melted and rapidly solidified microstructure 210 shown in FIG. 10 has dendrites with an average dendrite arm spacing of about 0.2 μm and within each cell is a non-equilibrium a' phase enriched (super saturated) with Fe and Mo.

Figure 11:
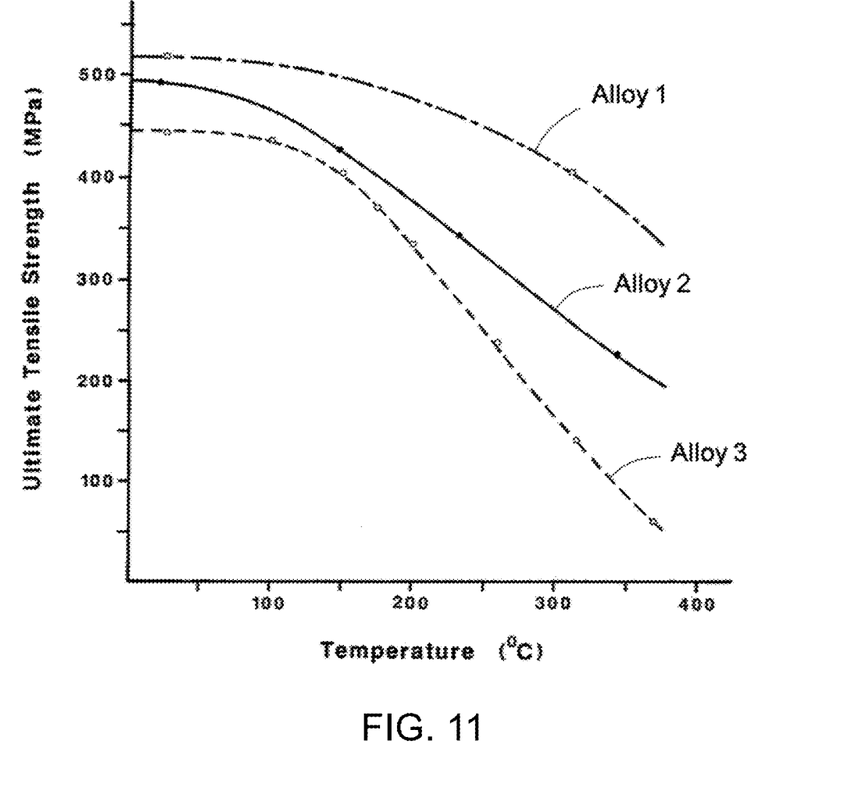
FIG. 11 is a plot of ultimate tensile strength versus temperature for an Al-8Fe-2Mo alloy part formed according to the teachings of the present disclosure (Alloy 1), an Al-8Fe-2Mo alloy part formed by powder extrusion (Alloy 2), and an age hardened 2618-T61 Al alloy (Alloy 3).

Referring now to FIG. 11, a plot of UTS for three Al alloy parts (i.e., tensile samples) tested at various temperatures is shown. One of the Al alloy parts was formed from the laser melted and rapidly solidified Al-8Fe-2Mo alloy (referred to herein as Alloy 1) and has a microstructure corresponding to FIG. 10. One of the Al alloy parts was formed from an extrusion of powders having the Al-8Fe-2Mo alloy composition (referred to herein as Alloy 2). The Al-8Fe-2Mo alloy powders were heated to and held at 300° C. for 2 hours and then extruded through a conical die with a 14:1 extrusion ration. Also, one of the Al alloy parts was formed from a wrought 2618-T61 Al alloy with a nominal composition, in weight %, of Al—2.3% Cu—1.6% Mg—1.1% Fe—1.0% Ni—0.18% Si—0.07% Ti (referred to herein as Alloy 3).

The 2618-T61 Al alloy part was age hardened via a T61 treatment that included a solution heat treat at about 529° C. and artificial aging at about 199° C. As shown in FIG. 11, Alloy 1 exhibited enhanced strength compared to Alloys 2 and 3. Particularly, at 250° C., the UTS for Alloys 1, 2 and 3 was about 450 megapascals (MPa), about 325 MPa, and about 250 MPa, respectively. At 300° C., the UTS for Alloys 1, 2 and 3 was about 420 MPa, about 275 MPa, and about 160 MPa, respectively. And at 350° C., the UTS for Alloys 1, 2 and 3 was about 355 MPa, about 220 MPa, and about 90 MPa, respectively. Table 1 below provides a summary of the UTS for Alloys 1, 2 and 3 at 250° C., 300° C. and 350° C.

TABLE 1

| Alloy | UTS (MPa) @ 250° C. | UTS (MPa) @ 300° C. | UTS (MPa) @ 350° C. |
|---|---|---|---|
| Alloy 1 | 450 | 420 | 355 |
| Alloy 2 | 325 | 275 | 220 |
| Alloy 3 | 250 | 160 | 90 |

Accordingly, additive manufactured parts formed by melting, rapidly solidifying and consolidating pre-alloyed Al-8Fe-2Mo powders (e.g., via SLM) into a near-net shaped part according to the teachings of the present disclosure have an UTS greater than 350 MPa at 250° C., greater than 300 MPa at 300° C. and greater than 250 MPa at 350° C. In some variations, additive manufactured metal parts formed by melting, rapidly solidifying and consolidating pre-alloyed Al-8Fe-2Mo powders into a near-net shaped metal part according to the teachings of the present disclosure have an UTS greater than 400 MPa at 250° C., greater than 350 MPa at 300° C. and greater than 300 MPa at 350° C. And in at least one variation, additive manufactured metal parts formed by melting, rapidly solidifying and consolidating pre-alloyed Al-8Fe-2Mo powders into a near-net shaped metal part according to the teachings of the present disclosure have an UTS greater than 450 MPa at 250° C., greater than 400 MPa at 300° C. and greater than 350 MPa at 350° C.

While the Example above is for part formed from Al—Fe—Mo pre-alloyed powders, it should be understood that other alloy systems (i.e., other pre-alloyed powders) are included with the scope of the present disclosure. Non-limiting examples of other alloy systems include Al—Fe—Zr pre-alloyed powders, Al—Fe—Hf pre-alloyed powders and Al—Fe—Nb pre-alloyed powders, among others.

It should be understood from the teachings of the present disclosure that a method of forming a part with enhanced properties is provided. The method includes melting and rapidly solidifying pre-alloyed powders to form a near-net shaped part with a microstructure comprising of a non-equilibrium phase. The near-net shaped part may or may not be subjected to additional processing such as grinding, drilling, milling, and machining, among others, in order to provide a finished or final part. However, the microstructure of the part does not undergo recrystallization and thermo-mechanical processing of the near-net shape is not desirable since it can induce recrystallization or decomposition of the metastable nonequilibrium phase(s). Also, the microstructure matrix of the part is super saturated with one or more alloying elements such that enhanced solid solution strengthening of the part is provided. For example, parts made from an Al alloy with an UTS greater than 300 MPa, greater than 350 MPa and/or greater than 400 MPa at 300° C. is provided using the method disclosed herein.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of manufacturing a part, the method comprising:
    melting a pre-alloyed Al—Fe—Mo powder, wherein the Al—Fe—Mo powder consists of Al, between 4.0 wt. % to 20 wt. % Fe, and between 1.0 wt. % to 10.0 wt. % Mo, via an additive manufacturing process to a liquid metal; and
    solidifying and consolidating at a cooling rate of greater than or equal to $10^{4°}$ C./s to less than or equal to $10^{7°}$ C./s such that a finished part formed by the method comprises a microstructure with at least one non-equilibrium phase and without sufficient diffusion to form equilibrium phases.

2. The method according to claim 1, wherein the additive manufacturing process forms a near-net shaped part and a matrix of the microstructure is a non-equilibrium phase that is retained after finishing the near-shaped metal part.

3. The method according to claim 1, wherein the additive manufacturing comprises a laser melting technique selected from the group consisting of selective laser melting and laser metal deposition.

4. The method according to claim 1, wherein the microstructure of the finished part has an average dendrite arm spacing of less than 1.0 μm.

5. The method according to claim 1, wherein the pre-alloyed Al—Fe—Mo powder consists of Al, 8.0 wt. % Fe and 2.0 wt. % Mo.

6. The method according to claim 1, wherein the finished part comprises at least one of an ultimate tensile strength greater than 300 MPa at 300° C. and an ultimate tensile strength greater than 250 MPa at 350° C.

7. The method according to claim 1, wherein the finished part comprises at least one of an ultimate tensile strength greater than 350 MPa at 300° C. and an ultimate tensile strength greater than 300 MPa at 350° C.

8. The method according to claim 1, wherein the finished part comprises at least one of an ultimate tensile strength greater than 400 MPa at 300° C. and an ultimate tensile strength greater than 350 MPa at 350° C.

9. The method according to claim 4, wherein the average dendrite arm spacing is less than 0.5 μm.

10. The method according to claim 4, wherein the microstructure is devoid of a stable intermetallic phase.

11. The method according to claim 5, wherein the microstructure of the finished part comprises an average dendrite arm spacing of less than 1.0 μm.

12. The method according to claim 11, wherein the average dendrite arm spacing is less than 0.5 µm.

13. The method according to claim 11, wherein the average dendrite arm spacing is less than 0.25 µm.

\* \* \* \* \*